(12) United States Patent
Eisenstock

(10) Patent No.: US 6,568,078 B2
(45) Date of Patent: May 27, 2003

(54) METHOD OF ASSEMBLING A CATALYTIC CONVERTER FOR USE IN AN INTERNAL COMBUSTION ENGINE

(75) Inventor: Gregory Eisenstock, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 10/143,255

(22) Filed: May 9, 2002

(65) Prior Publication Data

US 2002/0124403 A1 Sep. 12, 2002

Related U.S. Application Data

(63) Continuation-in-part of application No. 09/794,929, filed on Feb. 26, 2001, now Pat. No. 6,484,397.
(60) Provisional application No. 60/360,744, filed on Mar. 1, 2002.

(51) Int. Cl.[7] ................................................ B23P 15/00
(52) U.S. Cl. ................................... 29/890; 29/515
(58) Field of Search ....................... 29/890, 428, 515; 422/188, 171, 180

(56) References Cited

U.S. PATENT DOCUMENTS

| | | | |
|---|---|---|---|
| 4,011,651 A | | 3/1977 | Bradbury et al. |
| 4,093,423 A | | 6/1978 | Neumann |
| 5,082,479 A | | 1/1992 | Miller |
| 5,273,724 A | | 12/1993 | Bos |
| 5,724,735 A | * | 3/1998 | Ickes et al. ................. 29/890 |
| 5,729,902 A | * | 3/1998 | Wieres et al. .............. 29/890 |
| 5,953,817 A | * | 9/1999 | Watanabe et al. ........... 29/890 |
| 6,185,820 B1 | * | 2/2001 | Foster ........................ 29/890 |
| 6,192,581 B1 | * | 2/2001 | Tsukamoto ................. 29/852 |
| 6,293,010 B1 | * | 9/2001 | Umin et al. ................. 29/890 |
| 6,299,843 B1 | * | 10/2001 | Locker et al. .............. 422/179 |
| 6,305,081 B1 | * | 10/2001 | Beaver .................. 29/890.124 |
| 6,324,758 B1 | * | 12/2001 | Huang et al. ............... 29/890 |

FOREIGN PATENT DOCUMENTS

| | | |
|---|---|---|
| EP | 0 947 673 | 10/1999 |
| JP | 58-204913 | 11/1983 |
| WO | 99/28604 | 6/1999 |
| WO | 00/73637 | 12/2000 |

OTHER PUBLICATIONS

JP58204913, Nov. 29, 1983, Patent Abstracts of Japan, vol. 008, No. 050, Mar. 7, 1984.
JP55164713, Dec. 22, 1980, Patent Abstracts of Japan, vol. 005, No. 039, Mar. 14, 1981.

* cited by examiner

*Primary Examiner*—I Cuda Rosenbaum
(74) *Attorney, Agent, or Firm*—Kees van der Sterre

(57) ABSTRACT

A method of assembling a catalytic converter comprising a ceramic catalyst substrate supported by a compressed resilient mat within a metal shell comprising the steps of: (1) providing a slave enclosure exhibiting a predetermined shape that substantially matches the shape of the ceramic substrate; (2) providing a layer of resilient supporting mat material on the inner surface of the enclosure; (3) mechanically pre-compressing the encircling mat layer against the inner surface of the slave enclosure; (4) inserting the substrate into the slave enclosure while retaining the encircling mat layer against the inner surface and without further compressing the mat layer; and (5) transferring the substrate and mat layer into the metal shell.

10 Claims, 3 Drawing Sheets

(a)　(b)　(c)

METHOD OF ASSEMBLING A CATALYTIC CONVERTER FOR USE IN AN INTERNAL COMBUSTION ENGINE

CROSS-REFERENCE TO RELATED APPLICATION

This application is a continuation-in-part of U.S. application Ser. No. 09/794,929, filed Feb. 26, 2001 entitled "Method of Assembling a Catalytic Converter for Use in an Internal Combustion Engine", by G. Eisenstock et al. now U.S. Pat. No. 6,484,397 and additionally claims priority to U.S. Provisional Ser. No. 60/360,744 filed Mar. 1, 2002.

BACKGROUND OF THE INVENTION

The present invention relates to a process for the production of catalytic converters for purifying exhaust gases, and more particularly to a method for producing such catalytic converters by providing a pre-formed metal shell and supporting mat for a honeycomb catalyst or catalyst support, and compressing the supporting mat material against the metal shell prior to axially inserting the honeycomb catalyst therein.

As is well known, the purification of exhaust gases from internal combustion engines, particularly in motor vehicles, is generally achieved by an exhaust gas purification system in which a ceramic element having a honeycomb cell structure acts as a catalyst carrier. Typically, this honeycomb cell structure is covered with a supporting washcoat and a catalyst that contains a precious metal which functions, in the presence of $O_2$, to convert noxious components of the exhaust gas, such as HC and CO, to $H_2O$ and $CO_2$. The honeycomb cell structure is housed within a gas-tight, sheet metal or cast metal heat resistant housing commonly referred to as a can or shell.

Honeycomb structures currently employed are typically comprised of a ceramic material such as cordierite, a brittle material exhibiting limited mechanical strength in very thin cross-section. For this reason, catalytic converters in use today typically include a resilient supporting mat that is wrapped around the periphery of the honeycomb. This resilient material, which distributes any compressive forces uniformly on the ceramic, typically expands as the temperature increases. This being the case, the compressive supporting pressure on the honeycomb therefore increases at elevated temperatures, and in some degree compensates for the thermal expansion of the outer metal shell. Since the metal shell expands more than the enclosed ceramic honeycomb, this mat expansion with temperature rise, prevents the honeycomb from becoming loose in the shell.

There are known in the art various techniques for assembling the mat and ceramic monolith into a can to make catalytic converters as described above. In general, the existing techniques can be divided into two groups: (1) those processes where a pre-determined gap between the ceramic monolith and the metal shell is maintained during assembly (e.g., called stuff mounting or clam shell mounting); and (2) those processes where the pressure between the metal shell and the ceramic monolith can be adjusted during assembly (e.g., shoe-box and tourniquet mounting).

Stuff mounting techniques involve initially wrapping the substrate in a resilient mat and thereafter inserting the wrapped substrate into a conical device that compresses the mat around the substrate as both are pushed into the cone. The wrapped substrate is then pushed from the compression cone into a cylindrical tube that serves as the converter container or shell (see, for example U.S. Pat. No. 4,093,423 to Neumann). Clam shell canning involves the utilization of two metal shell halves which are closed around a mat-wrapped honeycomb and thereafter welded together; (see for example U.S. Pat. No. 5,273,724 to Bos).

The tourniquet method involves forming a rectangular flat sheet metal piece into a cylindrical shell around a mat-wrapped honeycomb, the combined assembly then being pulled together to overlap the sheet edges and develop a predetermined level of mat compression around the honeycomb. Thereafter, the lap joint is welded together to maintain the level of compression (see for Example U.S. Pat No. 5,082,479 to Miller).

All of the prior art methods of assembling catalytic converters discussed above all involve subjecting the ceramic substrate to substantial and sometime uneven compressive forces during catalytic converter assembly, as the supporting mat is compressed against the substrate during the mat pre-compression step of canning. In fact, the compressive stresses reached during canning can significantly exceed those encountered by the substrate in actual use, due to factors such as the room temperature visco-elastic characteristics of the mat material.

Damage to the catalyst substrate resulting from applied stress during canning has not been a problem for conventional catalyst substrates due to the relatively robust honeycomb structural designs that have been used. However, demands for improved catalyst performance have resulted in increasing demand for thin-wall and ultra-thin-wall catalyst substrates (e.g., substrates with honeycomb channel wall thicknesses approximating 0.004 inches [100 micrometers] or less, typically 25–100 micrometers).

With these developments therefore a need has arisen for an improved canning process that would reduce canning stress on honeycomb catalyst supports.

SUMMARY OF THE INVENTION

The present invention involves the method for mounting a honeycomb catalyst support within a metal shell wherein the support is entirely shielded from the forces of mat pre-compression. In accordance with that method the initial compression of the supporting mat is accomplished by pre-compressing the mat against the shell utilizing tooling designed for mat pre-compression, and then axially inserting the honeycomb substrate into opening formed by the shell and precompressed mat. The insertion step is generally carried out with no further compression of the precompressed mat.

The advantage of this approach is that it avoids the stresses inherent in prior art canning methods wherein mat compression is achieved by compressing the mat with the ceramic substrate itself. In other words, the instant assembly method comprises providing an (internally) mat layered metal shell, compressing the mat layer against the metal shell, and inserting the honeycomb substrate into the mat-layered shell. The compressive stresses then applied to the substrate by the precompressed mat in the course of compression release during or after substrate insertion are far less intense that those developed during the mat compression in most conventional canning procedures.

In general, the basic method of assembling these catalytic converters comprises the following steps: (1) providing an open-ended one piece metal shell; (2) positioning a layer of resilient mat material on the inside surface of the metal shell to form an encircling mat layer; (3) compressing the encircling mat layer; and, (4) inserting the ceramic substrate into the metal shell while retaining the encircling mat layer on the inside surface of the metal shell. In preferred embodiments mat layer compression is accomplished by passing a tapered, closely fitting arbor member into and through the mat-lined shell, followed immediately by the insertion of the ceramic substrate. However, some modification of these basic steps is required where the outlet end of the metal shell is constricted or blocked.

Canning substrates into end-constricted or end-blocked enclosures is required to be carried out for a number of common catalytic converter designs. For example, it is frequently advantageous to carry out the canning process using a shell that already incorporates a conical end element or section for the conveyance of exhaust gases into or out of the converter. Also common are catalytic converter designs wherein multiple ceramic substrates must be mounted in a single elongated metal shell. In either of these cases, the use of arbor tooling designed to pass completely through an open-ended shell for the purpose of mat pre-compression is not practical.

The present invention includes a process designed to overcome these limitations, by carrying out preliminary mat pre-compression and substrate insertion steps within an intermediate or so-called "slave" enclosure. More particularly, this catalytic converter assembly method comprises providing an open-ended slave enclosure having a slave open cross-section defined by an inside surface, that enclosure having an open cross-section corresponding substantially to the cross-section of a selected ceramic substrate as well as to the open cross-section of an end-blocked or end-constricted metal shell designed to provide the actual catalytic converter enclosure.

Proceeding with the canning process, a layer of resilient mat material is positioned against the inside surface of this slave enclosure to form an encircling mat layer and that layer is compressed against the inside surface to provide a pre-compressed layer for receiving the ceramic substrate. Without further mat compression, and prior to or concurrently with any mat de-compression, the ceramic substrate is then inserted into the mat-lined slave enclosure while maintaining the position of the mat layer within the enclosure.

Once the mat and substrate have been mounted in the slave enclosure, the open cross-section of that enclosure is aligned with the open cross-section of the metal converter shell and the substrate and mat are transferred as a unit into the latter. This transfer step may be carried out, for example, through the use of a pushing member that applies sliding force simultaneously to the substrate and mat. Transfer is most preferably accomplished without significant further compression of the encircling mat layer.

Using this slave enclosure and transfer method, no traversal of the converter shell by the compression tooling is required. Therefore, end blockages or constrictions in the metal shell, whether arising from the shell design or from one or more substrates previously mounted in the shell, are easily dealt with.

DETAILED DESCRIPTION OF THE INVENTION

The present invention relates to a process of assembling catalytic converters, and more particularly to a method of assembling catalytic converters which achieves a compressive load upon the honeycomb structure that is sufficient to retain, but not damage the retained honeycomb substrate, and which only subjects the ceramic substrate to mat release compression which is far less intensive than the compression the substrate is subject to in the prior art methods of assembling catalytic converters. Stated differently, the instant process avoids subjecting the honeycomb substrate to the normally high pressure compressive force peaks that are typical in the standard compression methods of forming catalytic converters.

Figure 1A:
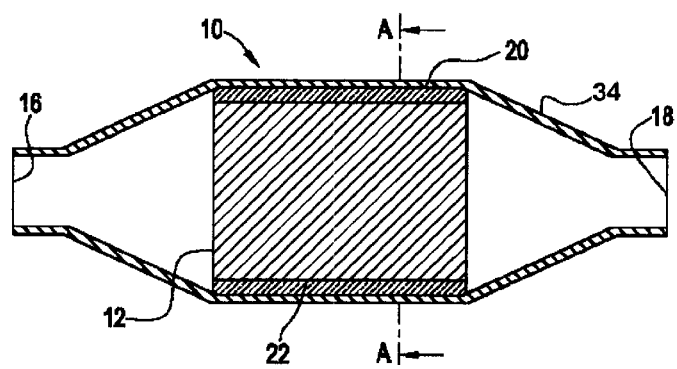
FIG. 1A is a schematic longitudinal sectional view of a catalytic converter, having a honeycomb structure, made in accordance with the method described herein.
Figure 1B:
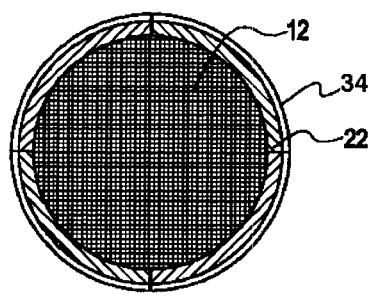
FIG. 1B is a cross-sectional view of the converter of FIG. 1 taken along the section line A—A.

FIGS 1A and 1B, illustrate a typical catalytic converter comprising a ceramic honeycomb structure which functions as the catalyst structure or carrier. The catalytic converter 10 comprises a cylindrical ceramic honeycomb 12 and metal casing/shell or can 34 enclosing the same. Metal shell 34 is formed of a material capable of resisting under-car salt, temperature and corrosion; ferritic stainless steels including grades SS-409, SS-439, and more recently SS-441 are however, generally preferred. The choice of material depends on the type of gas, the maximum temperature and the like. Honeycomb 12 is formed by extruding a ceramic material such as cordierite. Metal shell 34 has inlet and outlet ports 16 and 18 and a main body portion 20. Gas introduced through inlet port flows through individual cells of honeycomb 12 and out through outlet port 18.

Ceramic honeycomb 12, has square cells, although the cells of the honeycomb may have shapes other than square, including triangular, rectangular and the like. In consideration of the tooling costs for extrusion molding or the like, however the cells are generally square in shape.

Ceramic honeycomb 12 is supported on the metal shell main body 20 by means of encircling layer of resilient ceramic fiber mat or wire mesh 22 for use as a shock absorber. Encircling mat layer 22 is typically formed ceramic fiber material, either a simple nonexpanding ceramic material or an intumescent material, e.g., one which contains a vermiculite component that expands with heating to maintain firm compression when the outer steel expands outward from the ceramic monolith. Acceptable non-expanding ceramic fiber material include ceramic materials such as those sold under the trademarks "NEXTEL" and "SAFFIL" by the "3M" Company, Minneapolis, Minn. or those sold under the trademark "FIBERFRAX" and "CC-MAX" by the Unifrax Co., Niagara Falls, N.Y. Acceptable intumescent ceramics include materials such those sold under the trademark "INTERAM" by the "3M" Company, Minneapolis, Minn., as well as those intumescents which are also sold under the aforementioned "FIBERFRAX" trademark. Having a width substantially equal to the length of the honeycomb 12, the resilient mat layer mat 22 is interposed between ceramic body 12 and metal shell 14. The resilient mat layer once set presses the outer periphery of the honeycomb thereby fixing it against a drag caused by the gas flow.

In the prior art, the assembly of converters such as shown in FIGS. 1A–1B involved wrapping the substrate in a supporting mat material and inserting the wrapped substrate into a generally cylindrical metal container, either compressively closing the container around the mat-wrapped substrate or compressing the mat against the substrate and inserting the mat-wrapped substrate into the meal shell, to provide a gas tight seal and to hold the compressive stress. In both cases, the ceramic substrate provided the supporting surface against which mat compression was accomplished. The present invention is characterized in that mat compression is largely carried out before bringing the ceramic substrate into contact with the precompressed mat.

Figure 2A:
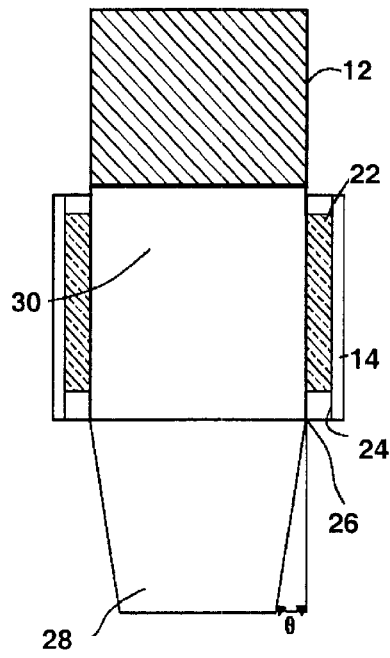
FIGS. 2A–2B are cross-sectional illustrations of two initial stages of a mat pre-compression method of assembling a catalytic converter.
Figure 2B:
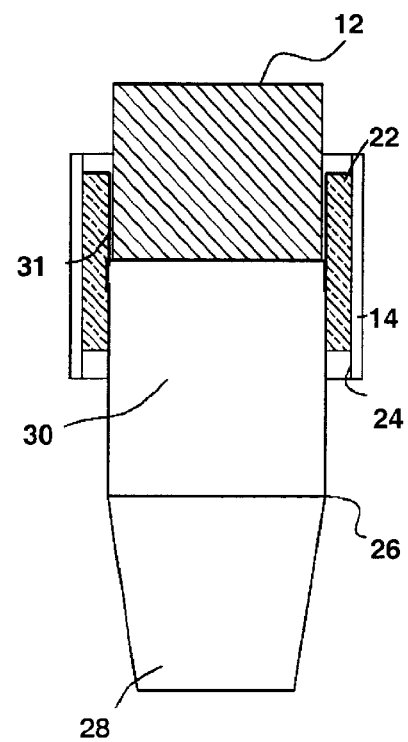

The initial stages of assembling a catalytic converter through the use of a slave enclosure are illustrated in FIGS. 2A and 2B of the drawings. Generally such assembly involves first providing an open-ended metal slave canister such as canister 14 in FIG. 2A, having a slave cross-section substantially matching in shape the cross-sectional shape of the ceramic substrate 12 to be canned (e.g. the substrate cross-section of substrate 12 in FIG. 1B). Into slave canister 12 is inserted a section of supporting mat material sufficient to form an encircling mat layer on an inside surface of the canister, the position of the mat layer corresponding to that of mat layer 22 on inside surface 24 of slave canister 14 as shown in FIGS. 2A–2B.

After the encircling mat layer has been positioned within slave canister 12 it is compressed against canister inside surface 24 to produce a precompressed mat layer 22. The preferred apparatus for achieving such mat pre-compression is tooling such as arbor 26. In the tooling embodiment shown in FIGS. 2A–2B, arbor 26 includes a tapered leading portion 28 and a cylindrical body portion 30, body portion 30 generally matching ceramic substrate 12 in cross-sectional shape. A suitable range of taper angles ($\theta$) between leading tapered portion 28 and body portion 30 is in range of 2 to 10°.

Body portion 30 of the arbor will be of a cross-sectional size or area at least equal to and usually somewhat larger than that of substrate 12 as suggested by gap 31 in FIG. 2B. Thus its cross-sectional size will be sufficient to compress the mat material into a layer thin enough to permit later substrate insertion without excessive mat drag.

At a minimum, the compression provided by body portion 30 should be such that the precompressed mat will have an initial or compressed mat gap bulk density higher than the selected final mat gap bulk density targeted for the resilient supporting mat as it will later support the ceramic substrate within the metal converter shell. Depending upon the mat material and/or level of compression required, arbor portion 30 may be allowed to rest against the precompressed mat layer for a time sufficient to "set" the mat thickness and somewhat retard mat compression release as the arbor is withdrawn.

As shown in FIG. 2B, after arbor 26 has developed the necessary mat pre-compression in mat layer 22, it is withdrawn from the exit end of slave canister 14 (downwardly in FIG. 2B), arbor withdrawal occurring concurrently with the insertion of ceramic substrate 12 into the slave canister. Both withdrawal and insertion are carried out while precompressed mat layer 22 is retained in position against inside surface 24 of slave canister 14.

It is also important that arbor withdrawal and substrate insertion be effected without further compression of encircling mat layer 22 by substrate 12, in order to avoid undue stress on the substrate. In fact, mat layer 22 will be typically be allowed to decompress to or toward its final mat gap bulk density during or subsequent to substrate insertion, the pressure of the decompressed mat against substrate 12 as mounted in slave canister 14 thereby being much less than that used to compress the mat.

To aid in the retention of the encircling mat layer within the slave canister during mat pre-compression and the ensuing substrate insertion, the arbor or other compression device should be comprised of a material that exhibits a low coefficient of friction. Static coefficients of friction of 0.15 or lower, determined as per JIS K-7125, more preferably 0.1 or lower, are useful. Friction coefficients of 0.01 and below are difficult to achieve due to material limitations. Suitable materials capable of providing the requisite low coefficient of friction include teflon-coated stainless steel or aluminum.

Steps subsequent to the mounting of the mat and substrate in the slave canister include arranging the slave canister in end-to-end proximity or contact with the converter shell, aligning the slave cross-section with the shell cross-section, and then transferring the ceramic substrate and mat layer into the metal shell to provide the desired converter assembly. During or certainly after this transfer, the precompressed mat layer will have expanded to a resilient mat layer of the selected final mat gap bulk density, that density being equal or less than the compressed density but nevertheless sufficient for retaining the mat and substrate firmly in position in the converter can during use with a motor vehicle.

Figure 3:
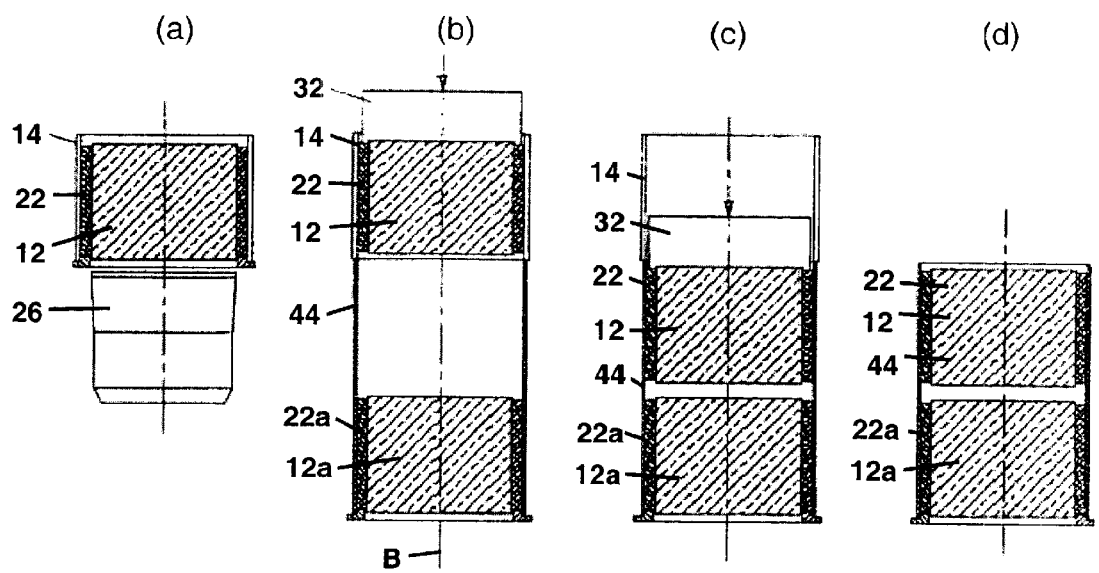
FIGS. 3(a)–(d) are cross-sectional illustrations of the stages of manufacturing a catalytic converter comprising two mat-wrapped ceramic substrates axially aligned within in a single metal converter shell.

FIGS. 3(a)–(d) of the drawings illustrate selected stages of a converter assembly process wherein the mounting of an additional ceramic substrate within a converter shell already containing a first ceramic substrate is required. As illustrated in FIG. 3(a), an open-ended slave canister 14 containing a ceramic substrate 12 surrounded by an encircling mat layer 22 is first provided, that assembly being completed through the use of arbor tooling 26 as hereinabove described. The mounting of these components proceeds by abutting one open end of slave canister 14 against the open end of a metal converter shell 44 as shown in FIG. 3(b). The relative positions of the canister and shell are arranged so the canister bottom opening and the shell top opening are fully aligned as indicated by common converter axis B. As also shown in FIG. 3(b), converter shell 44 is an "end-blocked" shell within which a ceramic substrate 12a and encircling mat layer 22a have previously been mounted.

To carry out the transfer of ceramic substrate 12 and encircling mat layer 22 from slave canister 14 to converter shell 44, a pushing element 32 is conveniently provided. That element is shaped to apply transfer pressure (downwardly in the drawings) against both substrate 12 and mat layer 22 simultaneously, so that both are moved together into shell 44 as shown in FIG. 3(c).

The product of the transfer thus carried out is the two-substrate converter shell illustrated in FIG. 3(d). Mounting of the ceramic substrates within this shell has thus been carried out without the application of excessive compressive force to either ceramic substrate, yet a converter assembly wherein both substrates are retained against axial movement by resilient mat layers of any suitable final gap bulk density has been provided.

Figure 4:
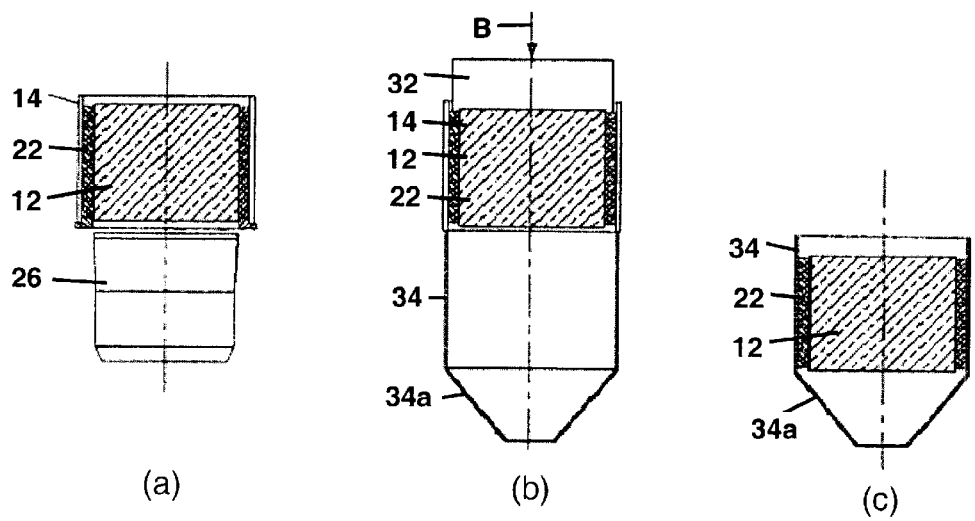
FIGS. 4(a)–(c) are cross-sectional illustrations of the stages of manufacturing a catalytic converter comprising a mat-wrapped ceramic substrate disposed in a metal shell incorporating an exhaust-gas-funneling end cone.

An embodiment of the invention wherein a ceramic substrate is mounted within a constricted-end converter shell incorporating an end restriction in the form of an exhaust gas collection cone is illustrated in FIGS. 4(a)–(c) of the drawings. As illustrated in FIG. 4(a), an open-ended slave canister 14 containing a ceramic substrate 12 surrounded by a encircling mat layer 22 is again provided through the use of arbor tooling 26. One open end of slave canister 14 is then abutted against the open end of a metal converter shell 34 as shown in FIG. 4(b), the positions of the canister and shell adjusted to provide full alignment of their openings as indicated by common converter axis B. The bottom end of converter shell 34 is in this case restricted by the presence of converter outlet cone 34a.

To carry out the transfer of ceramic substrate 12 and encircling mat layer 22 from slave canister 14 to converter shell 34 pushing element 32 is again used to apply simultaneous transfer pressure to both substrate 12 and mat layer 22. Both are then moved as a unit into shell 34.

The product of this procedure, illustrated in FIG. 4(c) of the drawings, is a catalytic converter assembly wherein the ceramic substrate 12 has been mounted within restricted-end shell 34, with greatly reduced mounting pressure having been applied by the compression of encircling mat layer 22 in the course of the mounting process.

Pressure data collected during the conventional stuff-mounting of ceramic honeycomb substrates within metal shells of dimensions equivalent to the slave enclosures and converter shells hereinabove described have been compared to those pressures developed during the arbor canning of identical substrates in accordance with the invention. These data indicate that substantial reductions in the pressures applied to the substrates are realized using the arbor canning process.

Figure 5:
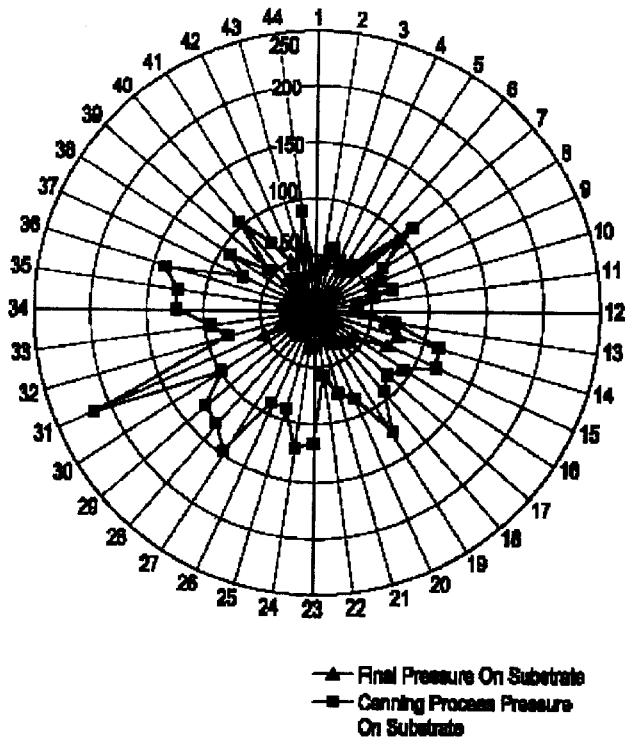
FIG. 5 is a pressure distribution graph plotting the pressure distribution across the radial area of a ceramic honeycomb substrate assembled by a prior art stuff-mounting technique.

FIG. 5 of the drawings reports pressure measurements collected at the skin surfaces of a cordierite ceramic honeycomb substrate of approximately 10.3 cm diameter and 7.5 cm length during conventional stuff-mounting in accordance with known prior practice. The encircling mat utilized for mounting was a hybrid laminar mat consisting of both an intumescent and a non-intumescent layer exhibiting a combined weight basis of 4550 g/m$^2$.

The radial pressure levels developed against this honeycomb substrate at 44 different radial positions around the honeycomb periphery were measured utilizing a Tekscan membrane pressure sensor. Data was collected both during and after the mat compression stages of the process. In FIG. 5, the pressure data reported for each radial location around the substrate periphery corresponded to the highest pressure value observed at any axial position along the substrate at that radial location. As FIG. 5 suggests, canning process pressures in excess of 200 psi were developed at selected points on the surface of the substrate during this stuff-mounting process even though the final mat retention pressures on the substrate were generally below 100 psi.

Figure 6:
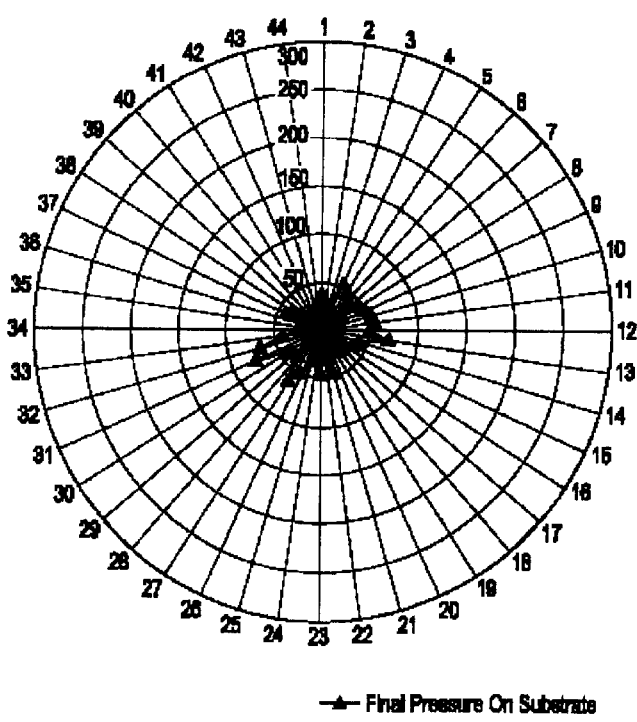
FIG. 6 is a pressure distribution graph plotting the pressure distribution across the radial area of a ceramic honeycomb substrate assembled by the method of the invention.

FIG. 6 of the drawing is a pressure plot similar in form and content to the plot shown as FIG. 5, but the data presented is for an arbor mounting process similar to the processes hereinabove described. The ceramic substrate and encircling mounting mat were the same in dimensions and composition as those used in the stuff-canning processes characterized in FIG. 5.

The radial pressure levels developed against the substrate during this canning process are reported in FIG. 6 of the drawings. As indicated in FIG. 6, arbor-canned substrates are not subjected to any mat compression pressures during the initial stages of the process, so no mat compression values were generated. Yet the moderate mat pressures observed at the conclusion of the mounting process, generally not in excess 75 psi, are quite adequate for insuring durable substrate retention within converters intended for general automotive applications.

Of course it will be appreciated that the foregoing examples and procedures are merely illustrative of the invention rather than limiting, and therefore that numerous adaptations and modifications of the particular materials and processes hereinabove described may be resorted to within the scope of the appended claims.

I claim:

1. A method of assembling a catalytic converter comprising a monolithic ceramic substrate encircled by a resilient supporting mat layer and mounted within a metal shell comprising the steps of:

providing (i) an open-ended slave enclosure having a slave open cross-section defined by an inside surface and (ii) a metal shell having a shell open cross-section corresponding to the first open cross-section;

positioning a layer of resilient mat material on the inside surface of the slave enclosure to form an encircling mat layer;

compressing the encircling mat layer against the inside surface of the slave enclosure to provide a pre-compressed mat layer;

inserting the ceramic substrate into the slave enclosure while retaining the pre-compressed mat layer on the inside surface thereof;

aligning the slave open cross-section with the shell open cross-section; and transferring the ceramic substrate and pre-compressed mat layer from the slave enclosure into the metal shell.

2. A method of making a catalytic converter assembly for purifying exhaust gases from an internal combustion engine, the assembly comprising a monolithic ceramic substrate surrounded by a resilient supporting mat and enclosed in a metal shell, comprising the steps of:

providing a metal shell having a shell cross-section substantially matching cross-sectional shape of the ceramic substrate;

providing an open-ended metal slave canister having a slave cross-section substantially matching the cross-sectional shape of the ceramic substrate;

inserting into the metal slave canister a section of supporting mat material sufficient to form an encircling mat layer on an inside surface of the canister;

compressing the encircling mat layer against the inside surface of the slave canister to a pre-compressed mat layer having an initial mat gap bulk density that is higher than a selected final mat gap bulk density for the resilient supporting mat;

inserting the ceramic substrate into the slave canister while retaining the pre-compressed mat layer therein but without further compression of the encircling mat layer;

aligning the slave cross-section with the shell cross-section; and transferring the ceramic substrate and mat layer into the metal shell to provide an assembly wherein the pre-compressed mat layer is expanded to a resilient mat layer of the selected final mat gap bulk density.

3. The method of claim 1 wherein the step of compressing the encircling mat layer comprises:

providing a compression device having a small portion and a large portion, the large portion having a cross section that corresponds in shape but is larger in area than the cross-section of the ceramic substrate;

inserting the compression device into the slave enclosure so that (i) first the small portion and then the large portion enters the enclosure and (ii) the large portion compresses the encircling mat layer against the inside surface of the enclosure to provide the precompressed mat layer.

4. The method of claim 3 wherein the large portion of the compression device rests against the precompressed mat layer for time sufficient to retard mat compression release.

5. The method of claim 3 wherein the small portion of the compression device comprises or adjoins a tapered segment connecting with the large portion and the large portion comprises a straight cylindrical section having an outer wall of a length at least as long as the encircling mat layer.

6. The method of claim 2 wherein the pre-compressed mat layer expands from the initial gap bulk density toward the final gap bulk density as the ceramic substrate is inserted into the slave canister.

7. The method of claim 1 wherein the step of transferring the ceramic substrate and pre-compressed mat layer from the open-ended slave enclosure into the metal shell comprises abutting an end of the slave canister against an open end of the metal shell and simultaneously pressing the ceramic substrate and pre-compressed mat layer into the metal shell with a pusher element in contact with both the substrate and the mat layer.

8. The method of claim 7 wherein the metal shell includes a blocked end opposite the open end.

9. The method of claim 8 wherein the blocked end comprises a metal cone section integral with or attached to the shell.

10. The method of claim 8 wherein the blocked end is formed by at least one additional ceramic substrate mounted within the metal shell.

* * * * *